(12) United States Patent
Toyoshima et al.

(10) Patent No.: US 11,048,258 B2
(45) Date of Patent: Jun. 29, 2021

(54) TERMINAL

(71) Applicant: NOMURA RESEARCH INSTITUTE, LTD., Tokyo (JP)

(72) Inventors: Susumu Toyoshima, Tokyo (JP); Yoshinobu Nagao, Tokyo (JP); Yasuyuki Tokuda, Tokyo (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 0 days.

(21) Appl. No.: 16/818,572

(22) Filed: Mar. 13, 2020

(65) Prior Publication Data
US 2021/0064038 A1    Mar. 4, 2021

(30) Foreign Application Priority Data

Sep. 2, 2019   (JP) .............................. JP2019-159699

(51) Int. Cl.
*G06T 19/00* (2011.01)
*G05D 1/00* (2006.01)
*G08C 17/02* (2006.01)
*G05D 1/08* (2006.01)

(52) U.S. Cl.
CPC ......... *G05D 1/0094* (2013.01); *G05D 1/0016* (2013.01); *G05D 1/0038* (2013.01); *G05D 1/0808* (2013.01); *G06T 19/003* (2013.01); *G08C 17/02* (2013.01)

(58) Field of Classification Search
CPC .. G05D 1/0094; G05D 1/0016; G05D 1/0038; G05D 1/0808; G06T 19/003; G08C 17/02
See application file for complete search history.

(56) References Cited

U.S. PATENT DOCUMENTS

| | | | |
|---|---|---|---|
| 2018/0218533 A1* | 8/2018 | Millin .................. | G01C 11/34 |
| 2018/0330528 A1* | 11/2018 | Loveland ................ | G06T 11/60 |
| 2019/0023418 A1* | 1/2019 | Ro ........................... | B64F 1/22 |
| 2019/0068962 A1* | 2/2019 | Van Schoyck ....... | G06K 9/0063 |
| 2019/0118945 A1* | 4/2019 | Loveland ............. | G05D 1/0202 |

OTHER PUBLICATIONS

"DroneDeploy". https://web.archive.org/web/20180902093112/http://dronebank.jp/dronedeploy/. Accessed Sep. 2, 2018. (Year: 2018).*

(Continued)

*Primary Examiner* — Zhihan Zhou
(74) *Attorney, Agent, or Firm* — Rankin, Hill & Clark LLP

(57) ABSTRACT

A terminal that controls an unmanned flying device equipped with an imaging function, the terminal comprising: a function of acquiring information for setting a first operation of the unmanned flying device so that an object is imaged; a function of acquiring an image acquired as a result of the unmanned flying device performing the first operation from the unmanned flying device; a function of using the image to receive a designation of a part of the object from a user; and a function of setting a second operation of the unmanned flying device so that an image of the designated part of the object that is more detailed than the image of the designated part of the object acquired in the first operation is acquired.

9 Claims, 14 Drawing Sheets

(56) References Cited

OTHER PUBLICATIONS

"DJI Mavic Pro & Mavic Pro Platinum", [online], DJI, Searched on Aug. 21, 2019, Retrieved on Mar. 13, 2020 from the Internet: < https://www.dji.com/jp/mavic>.

"DroneDeploy", [online], Dronebank, Searched on Aug. 21, 2019, Retrieved on Mar. 13, 2020, 2020 from the internet: <https://dronebank.jp/dronedeploy/index.html>; English translation.

"Provide drone-based social infrastructure maintenance services from spring 2019—Realization of efficient social infrastructure maintenance and management using images taken with drones—", Press Release 2018, Nov. 7, 2018, [online], Softbank Corp., Searched on Aug. 22, 2019, Retrieved on Mar. 13, 2020 from the internet: <https://www.softbank.jp/corp/news/press/sbkk/2018/20181107_01/ >; English translation.

"Drone", [online], Ministry of Economy, Trade and Industry, Searched on Aug. 22, 2019, Retrieved on Mar. 13, 2020 from the internet: <https://www.meti.go.jp/policy/mono_info_service/mono/robot/drone.html >; English translation.

* cited by examiner

| OUTLINE FLIGHT ID | TIME | POSITION | IMAGE FILE (MAXIMUM OF 2 MB) |
|---|---|---|---|
| A01 | 2019/8/16 9:03 | (x1, y1, z1) | ... |
|  | 2019/8/16 9:05 | (x2, y2, z2) | ... |

| DETAILED FLIGHT ID | DESIGNATED PART ID | TIME | POSITION | IMAGE FILE (MAXIMUM OF 20 MB) |
|---|---|---|---|---|
| B01 | TIP1 | 2019/8/16 10:33 | (x3, y3, z3) | ... |
|  |  | 2019/8/16 10:34 | (x4, y4, z4) | ... |

| DETAILED FLIGHT ID | OBJECT ID | DESIGNATED PART ID | DESIGNATED RECTANGULAR IMAGE FILE | TIME | FLIGHT PATH | IMAGE FILE OF DESIGNATED PART |
|---|---|---|---|---|---|---|
| B01 | BS#1000 | TIP1 | ⋮ | 2019/8/16 9:00 | (x7, y7, z7) --> (x8, y8, z8), STRAIGHT LINE | ⋮ |
| B03 | BS#1000 | TIP1 | ⋮ | 2019/8/17 12:00 | (x7, y7, z7) --> (x8, y8, z8), STRAIGHT LINE | ⋮ |
| C01 | BS#105 | TIP4 | ⋮ | 2019/8/19 11:00 | (x6, y6, z6) --> (x9, y9, z9), STRAIGHT LINE | |

TERMINAL

TECHNICAL FIELD

The present invention relates to a terminal for controlling an unmanned flying device having an imaging function.

BACKGROUND ART

Batteries have been reduced in size and weight, and sensors such as gyro sensors and acceleration sensors have been sophisticated in recent years. As a result, the operational stability of unmanned small flying devices called drones has been improved, and such drones have been supplied at low prices. The Ministry of Economy, Trade and Industry of Japan has advocated an "Aerial Industrial Revolution" and is promoting technological development and environmental improvement for safe use of drones (for example, see Non Patent Literature 4).

Patent Literature 1 discloses a technique for generating a three-dimensional model of an object by performing aerial photography by a drone.

CITATION LIST

Patent Literature

Patent Literature 1: US 2018/0,218,533 A

Non Patent Literature

Non Patent Literature 1: https://www.dji.com/jp/mavic, searched on Aug. 21, 2019
Non Patent Literature 2: https://dronebank.jp/dronedeploy/index.html, searched on Aug. 21, 2019
Non Patent Literature 3: https://www.softbank.jp/corp/news/press/sbkk/2018/20181107_01/, searched on Aug. 22, 2019
Non Patent Literature 4: https://www.meti.go.jp/policy/mono info service/mono/robot/drone.html, searched on Aug. 22, 2019

SUMMARY OF INVENTION

Technical Problem

In a case where a three-dimensional model is generated from an image captured by a camera of a drone, a communication speed between the drone and a control terminal of the drone may be a bottleneck. In particular, in order to generate a detailed three-dimensional model of an object, it is necessary to acquire many images having high resolution, that is, having a large size, and transmit the images from the drone to a processing terminal. However, communication between the drone and the processing terminal is wireless communication, and is not suitable for transmitting and receiving a large amount of data in a short period of time. Alternatively, if an attempt is made to mount a high-speed, large-capacity wireless communication module that achieves such a transmission and reception, the cost of the drone increases.

The present invention has been made in view of such problems, and an object of the present invention is to provide support technology that enables a detailed inspection of an object using a drone while suppressing an increase in cost.

Solution to Problem

One aspect of the present invention relates to a computer program. This computer program causes a terminal that controls an unmanned flying device having an imaging function to achieve a function of acquiring information for setting a first operation of the unmanned flying device so that an object is imaged, a function of acquiring, from the unmanned flying device, an image acquired as a result of the unmanned flying device performing the first operation, a function of using the image to receive a designation of a part of the object from a user, and a function of setting a second operation of the unmanned flying device so that an image of the designated part of the object that is more detailed than the image of the designated part of the object acquired in the first operation is acquired.

Note that, any combination of the constituent elements and what are obtained by exchanging the constituent elements and expressions of the present invention between a method, a system, and a recording medium storing the computer program is also effective as an aspect of the present invention.

Advantageous Effects of Invention

According to the present invention, it is possible to provide support technology that enables a detailed inspection of an object using a drone while suppressing an increase in cost.

BRIEF DESCRIPTION OF DRAWINGS

FIG. 8 is a data structure diagram illustrating an example of an outline image information holding unit in FIG. 7.

FIG. 9 is a data structure diagram illustrating an example of a detailed image information holding unit in FIG. 7.

FIG. 10 is a data structure diagram illustrating an example of a detailed flight history holding unit in FIG. 7.

DESCRIPTION OF EMBODIMENTS

Hereinafter, the same or equivalent components, members, and processes illustrated in each drawing are denoted by the same reference signs, and the repeated description will be omitted as appropriate. Additionally, in each drawing, some of the members that are not important for the description are omitted.

Figure 1:
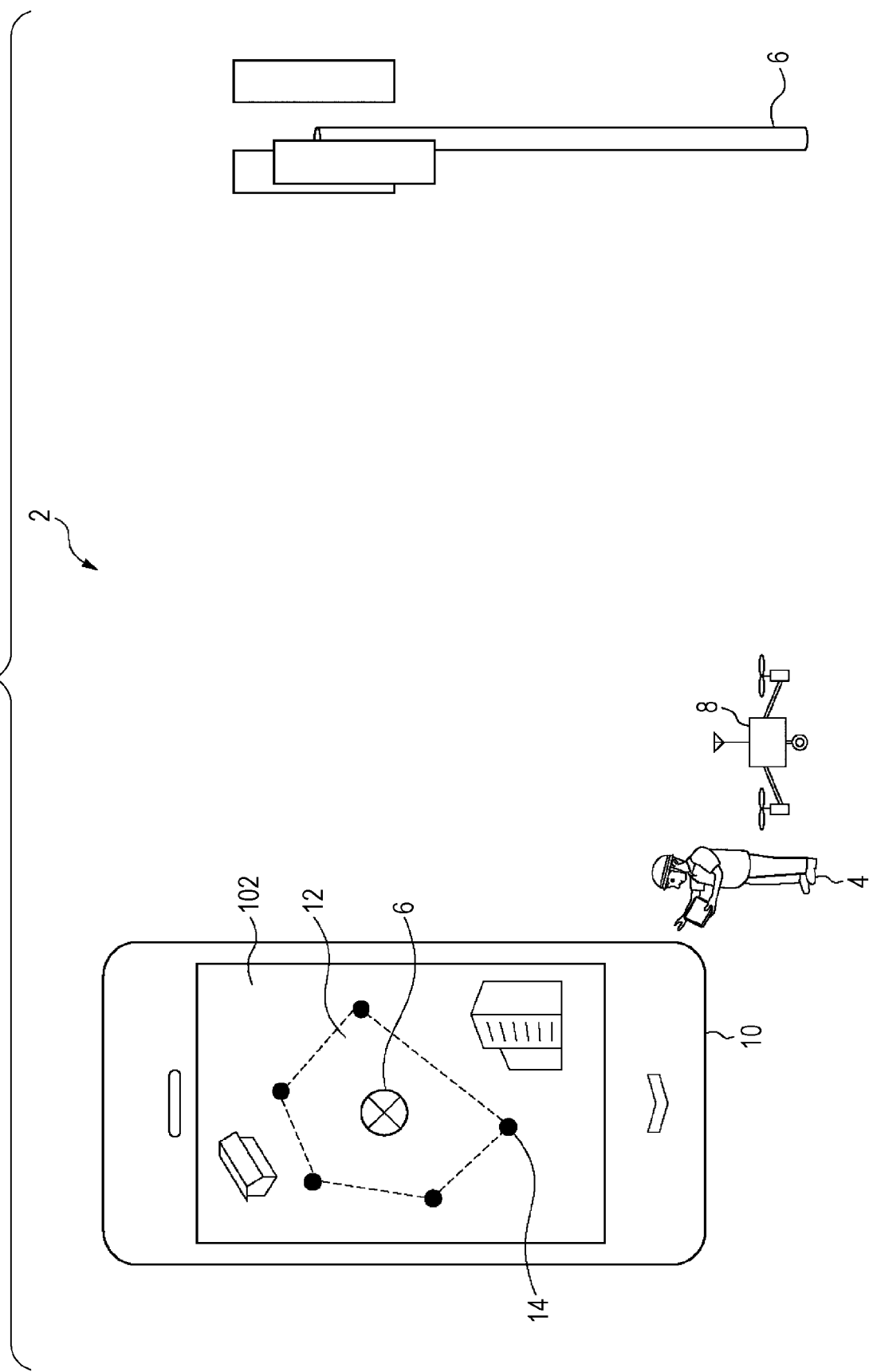
FIG. 1 is a schematic diagram for describing an inspection support system according to an embodiment.

FIG. 1 is a schematic diagram for describing an inspection support system 2 according to an embodiment. The inspection support system 2 supports an inspection of an object to be inspected that is performed by a worker (user 4) using an unmanned flying device such as a drone 8. In the present embodiment, a base station apparatus 6 of a mobile telephone network is assumed as the object to be inspected, but the object to be inspected is not limited to the base station apparatus 6, and in other embodiments, for example, a power-related infrastructure facility such as a transmission line and an architectural structure such as a building, bridge, and dam may be an object to be inspected.

The inspection support system 2 includes a mobile terminal 10 of the user 4 and the drone 8. The mobile terminal 10 and the drone 8 are configured to be communicable, and this communication may be achieved by a direct wireless communication means such as Bluetooth (registered trademark) or WiFi (registered trademark), or may be achieved by a mobile phone network or the Internet. The mobile terminal 10 is a terminal that controls the drone 8.

The mobile terminal 10 is a mobile terminal such as a smartphone, a tablet terminal, a laptop personal computer, and a dedicated controller. The user 4 downloads an inspection support application program (hereinafter referred to as an inspection support application) from a download site to the mobile terminal 10 via a network and install the inspection support application program. Alternatively, the inspection support application may be preinstalled on the mobile terminal 10. Furthermore, the inspection support application may be configured to be of an application service provider (ASP) type or a software as a service (SaaS) type. The mobile terminal 10 executes the inspection support application, whereby the mobile terminal 10 communicates with the drone 8 and achieves various functions. Hereinafter, functions achieved by (processing units such as a central processing unit (CPU) of) the mobile terminal 10 executing the inspection support application may be described as functions of the mobile terminal 10, but those functions are functions that the inspection support application causes the mobile terminal 10 to achieves.

The drone 8 is a relatively small device that flies in an unmanned manner, and may fly by remote control via wireless communication or may fly autonomously. In the present embodiment, as the drone 8, a general-purpose drone having an imaging function such as a camera, a positioning function such as a global positioning system (GPS), and a function of communicating with the mobile terminal 10, for example, a DJI Mavic Pro (Non Patent Literature 1) is assumed.

Referring to FIG. 1, first, the user 4 designates an area to be imaged by the drone 8 (hereinafter, referred to as an imaging area 12) on a display 102 of the mobile terminal 10. In particular, the user 4 designates the base station apparatus 6 that is the object to be inspected on an electronic map displayed on the display 102, and then sets the imaging area 12 so that the base station apparatus 6 enters the imaging area 12. The object to be inspected such as the base station apparatus 6 may be displayed as an object that can be designated on the electronic map. The imaging area 12 may be designated by a polygon connecting points 14 tapped by the user 4 on the display 102. Alternatively, when the object corresponding to the base station apparatus 6 is selected on the electronic map, the imaging area 12 may be automatically set. For example, the imaging area 12 may be set as a circular area having a predetermined radius centered on the position of the base station apparatus 6.

Figure 2:
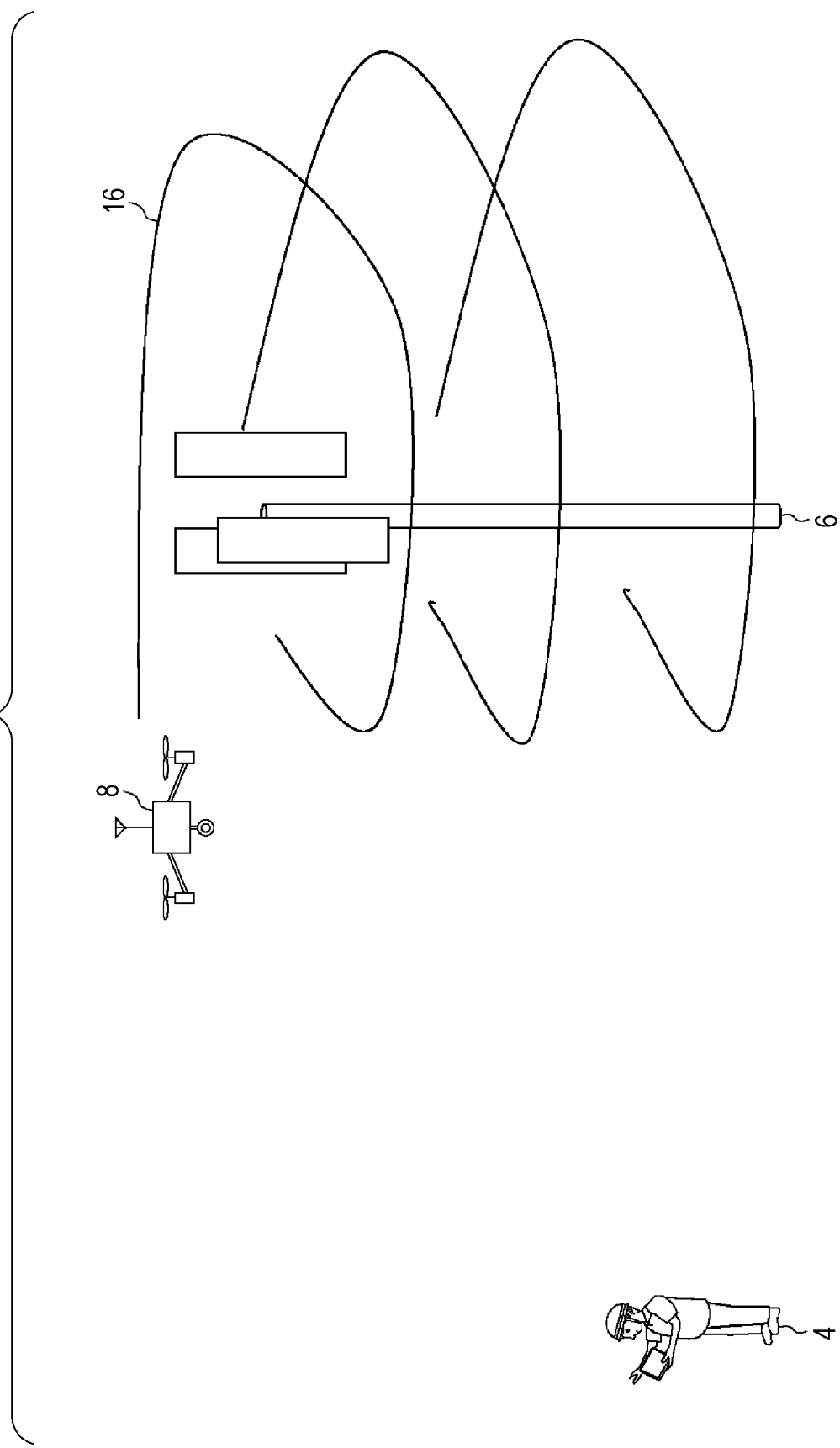
FIG. 2 is a schematic diagram illustrating a situation in which a drone flies along an outline flight path that is set while corresponding to a base station apparatus and images the base station apparatus.

FIG. 2 is a schematic diagram illustrating a situation in which the drone 8 flies along an outline flight path 16 that is set while corresponding to the base station apparatus 6 and images the base station apparatus 6. When the user 4 designates the base station apparatus 6 and the imaging area 12 related to the base station apparatus 6, the mobile terminal 10 sets the outline flight path 16 of the drone 8 so that an image necessary to generate an outline or coarse three-dimensional model of the designated base station apparatus 6 (hereinafter, referred to as an outline three-dimensional model) can be acquired.

Referring to FIG. 2, the drone 8 captures an image of the base station apparatus 6 while flying according to the outline flight path 16, and transmits the acquired image to the mobile terminal 10. The mobile terminal 10 uses the acquired image to generate an outline three-dimensional model of the base station apparatus 6. Setting of the outline flight path 16 of the drone 8 and generation of the three-dimensional model using the image acquired from the drone 8 may be achieved using known drone three-dimensional (3D) Mappping technology (e.g., refer to Non Patent Literature 2).

Figure 3:
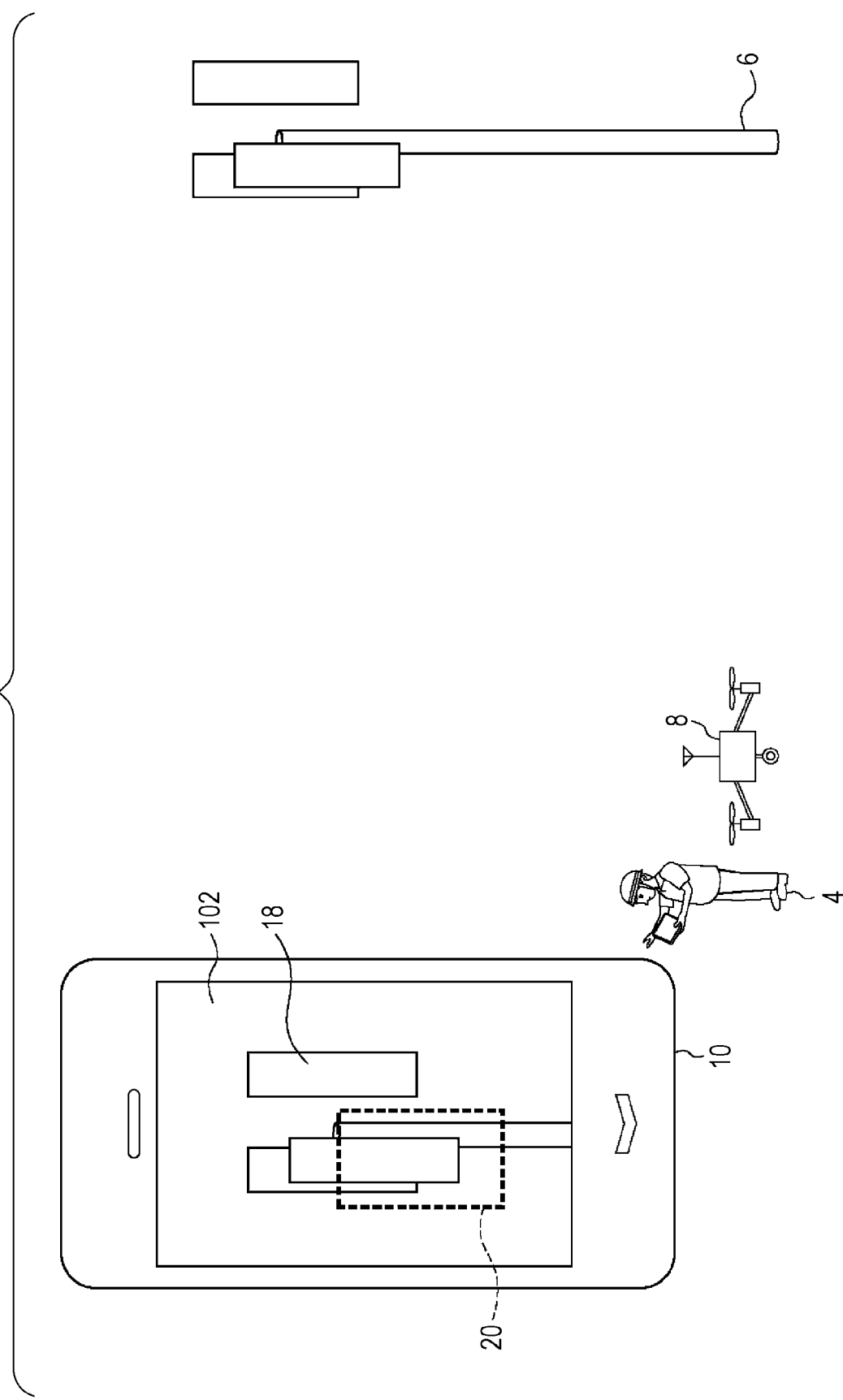
FIG. 3 is a schematic diagram illustrating a situation in which a user designates a part whose details are to be confirmed in a generated outline three-dimensional model.

FIG. 3 is a schematic diagram illustrating a situation in which the user 4 designates a part whose details are to be confirmed in a generated outline three-dimensional model 18. The mobile terminal 10 causes the display 102 to display the generated outline three-dimensional model 18 of the base station apparatus 6. The user 4 designates a part of the base station apparatus 6 whose details the user 4 desires to confirm among parts of the base station apparatus 6, by drawing a rectangle 20 on the outline three-dimensional model 18 displayed on the display 102. The mobile terminal 10 specifies the part in the rectangle 20 as a designated part. The mobile terminal 10 sets a detailed flight path 22 of the drone 8 so that an image necessary to generate a detailed or fine three-dimensional model of the designated part (hereinafter, referred to as a detailed three-dimensional model) can be acquired on the basis of the positioning information when the designated part was imaged in the outline flight path 16. The detailed three-dimensional model has a smaller granularity than the outline three-dimensional model and/or a higher resolution than the outline three-dimensional model, and/or a larger data amount for each object than the outline three-dimensional model.

Note that a plurality of types of rectangles 20 having different colors, line types, and shapes may be used. In this case, different types of rectangles may correspond to different instruction contents. For example, in a case where a designation is made by a red frame rectangle, the mobile terminal 10 may interpret the designation as an instruction to image only the surface of the rectangle in detail. In a case where a designation is made by a blue frame rectangle, the mobile terminal 10 may interpret the designation as an instruction to image a part in the rectangle in all directions in detail.

Additionally, the shape may be not only a rectangle but also a circle, a triangle, or the like, as long as an area can be designated. Instead of the area, a user may designate only a point and set an area around the point as a target area.

Figure 4:
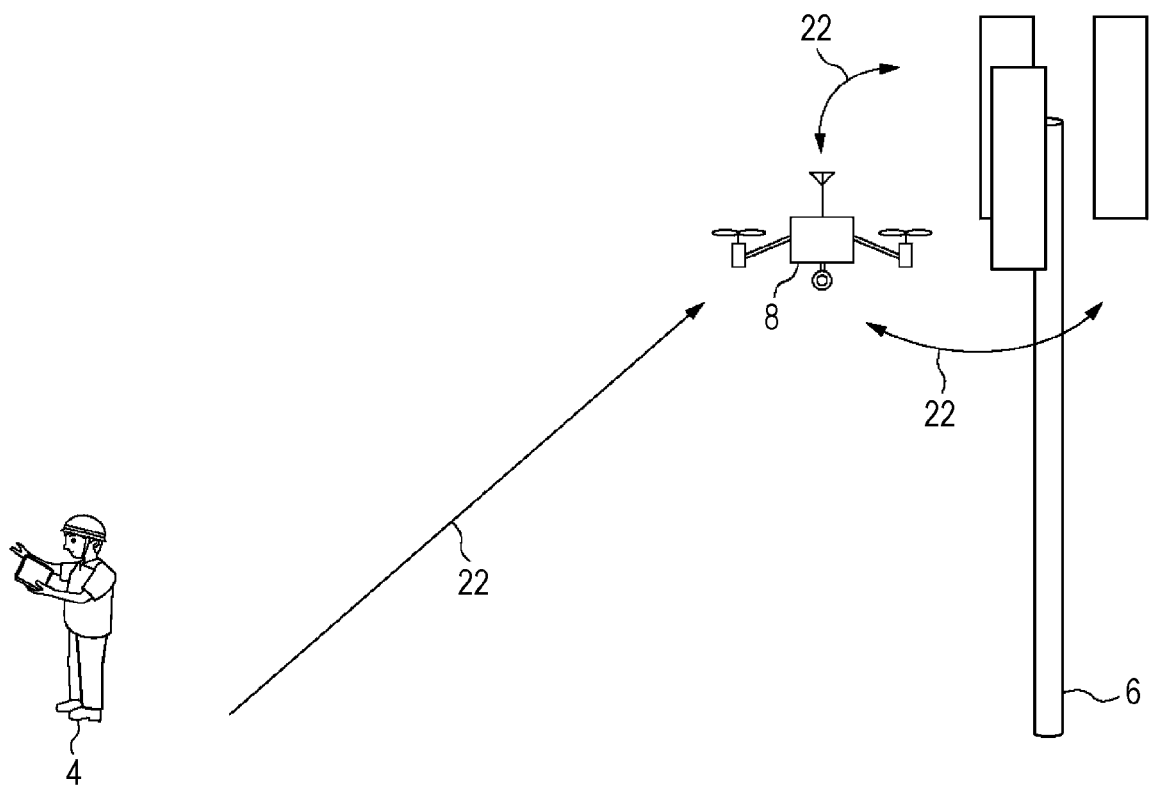
FIG. 4 is a schematic diagram illustrating a situation in which the drone flies along a detailed flight path that is set while corresponding to a designated part of the base station apparatus and images the designated part.

FIG. 4 is a schematic diagram illustrating a situation in which the drone 8 flies according to the detailed flight path 22 that is set while corresponding to the designated part of the base station apparatus 6 and images the designated part. The drone 8 captures an image of the designated part of the base station apparatus 6 while flying according to the detailed flight path 22, and transmits an acquired image to the mobile terminal 10. The mobile terminal 10 uses the acquired image to generate a detailed three-dimensional model 24 of the designated part.

Figure 5:
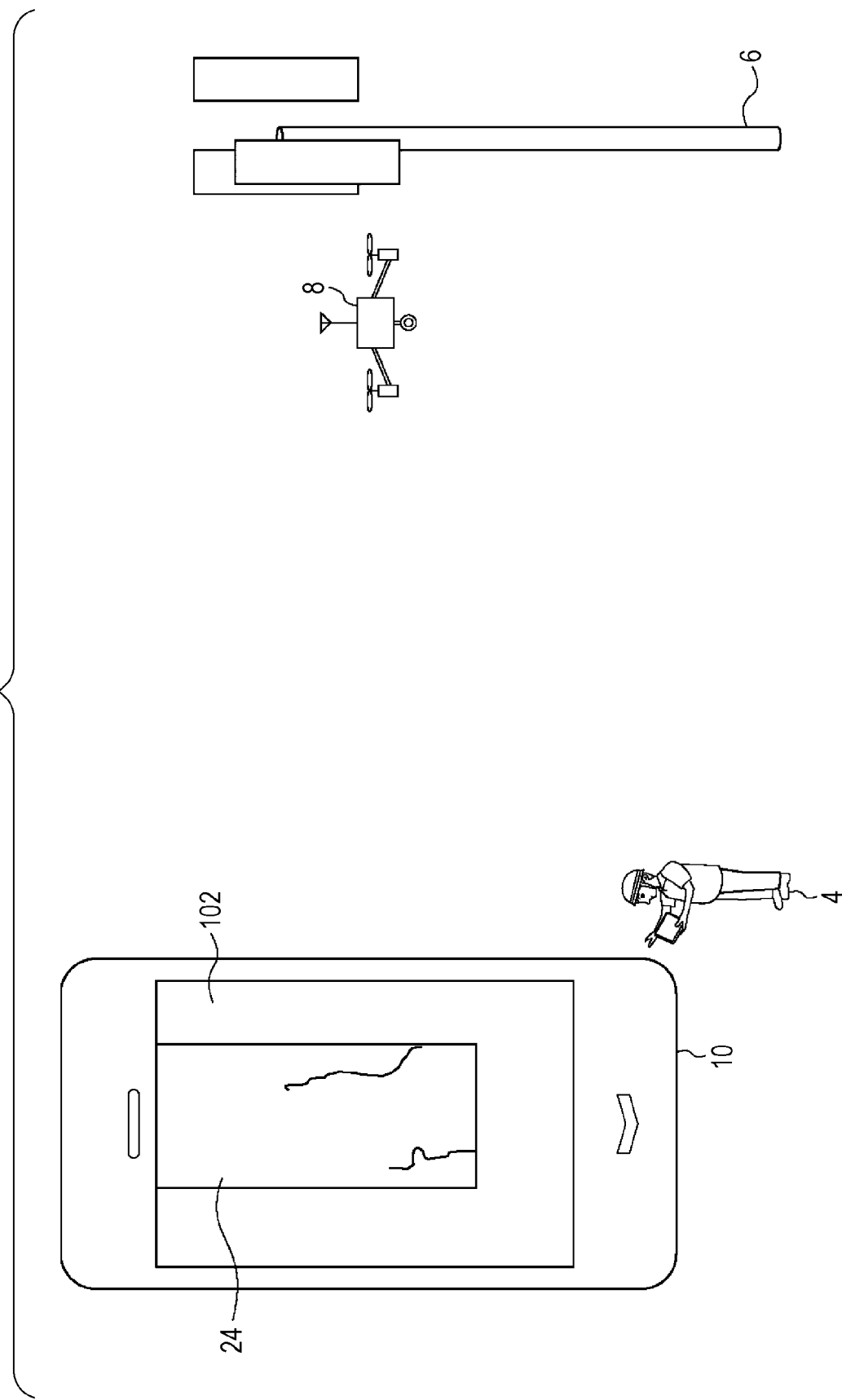
FIG. 5 is a schematic diagram illustrating a situation in which the user is confirming a generated detailed three-dimensional model.

FIG. 5 is a schematic diagram illustrating a situation in which the user 4 is confirming the generated detailed three-dimensional model 24. The mobile terminal 10 causes the display 102 to display the generated detailed three-dimensional model 24 of the designated part. The user 4 confirms the state of the designated part (a flaw, crack, discoloration, deterioration, dropout, foreign matter attachment, and the like) from a displayed detailed image of the designated part.

An inspection of an infrastructure or building is usually required to find an abnormality such as a crack on the order of one mm to several mm. In order to find an abnormality at this level, it is necessary to acquire a relatively detailed image. However, it is not realistic to acquire an image at that level when generating a three-dimensional model of the whole of the object to be inspected in terms of time and processing load. Therefore, in a support system 2 according to the present embodiment, first, the outline three-dimensional model 18 of the object to be inspected is generated, and the outline three-dimensional model 18 is used to receive the designation of a part to be inspected from the user 4. Next, the drone 8 is flown once again so as to image the part designated by the user 4 in detail, and the detailed three-dimensional model 24 is generated. Thus, the user 4 can confirm a state of the necessary part in detail after grasping the whole of the object to be inspected schematically in the inspection. In addition, since there is no need to generate a detailed three-dimensional model of the whole object to be inspected, time required for the inspection can be reduced. Furthermore, since higher communication performance is not required for the drone 8, costs can be reduced.

Figure 6:
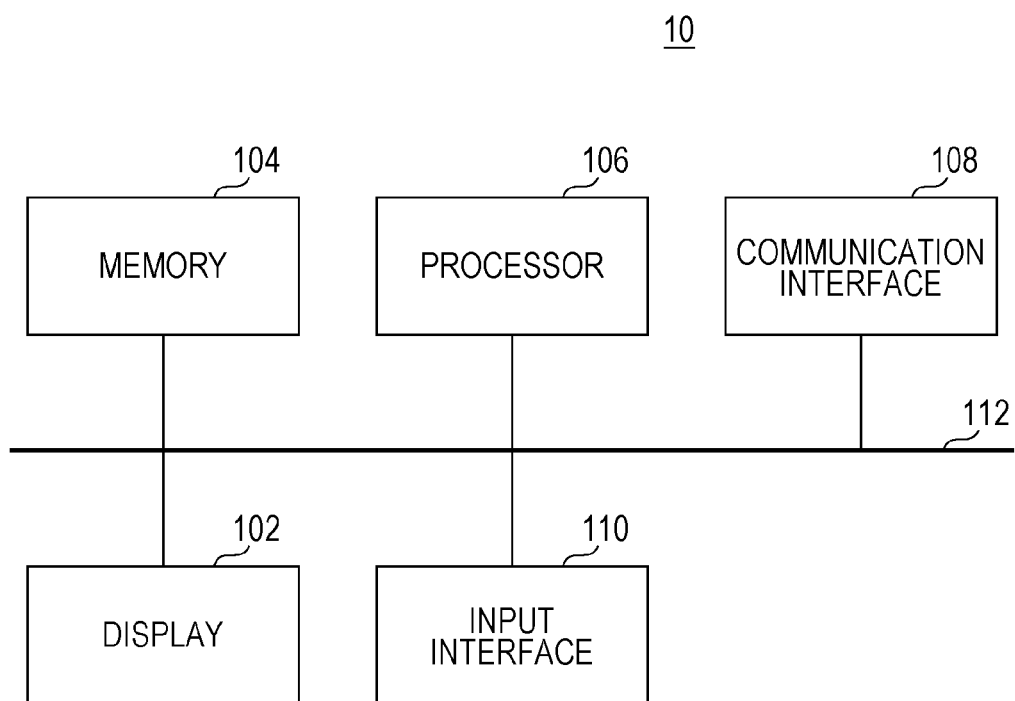
FIG. 6 is a hardware configuration diagram of a mobile terminal illustrated in FIG. 1.

FIG. 6 is a hardware configuration diagram of the mobile terminal 10 of FIG. 1. The mobile terminal 10 includes a memory 104, a processor 106, a communication interface 108, the display 102, and an input interface 110. These elements are each connected to a bus 112 and communicate with each other via the bus 112.

The memory 104 is a storage area for storing data and a program. The data and the program may be permanently stored in the memory 104 or may be temporarily stored. In particular, the memory 104 stores the inspection support application. The processor 106 achieves various functions in the mobile terminal 10 by executing the program stored in the memory 104, particularly, the inspection support application. The communication interface 108 is an interface for transmitting and receiving data to and from the outside of the mobile terminal 10. For example, the communication interface 108 includes an interface for accessing a network and an interface for performing direct wireless communication with the drone 8. The display 102 is a device for displaying various information, and is, for example, a liquid crystal display or an organic electroluminescence (EL) display. The input interface 110 is a device for receiving an input from the user. The input interface 110 includes, for example, a touch panel provided on the display 102 and various input keys.

Figure 7:
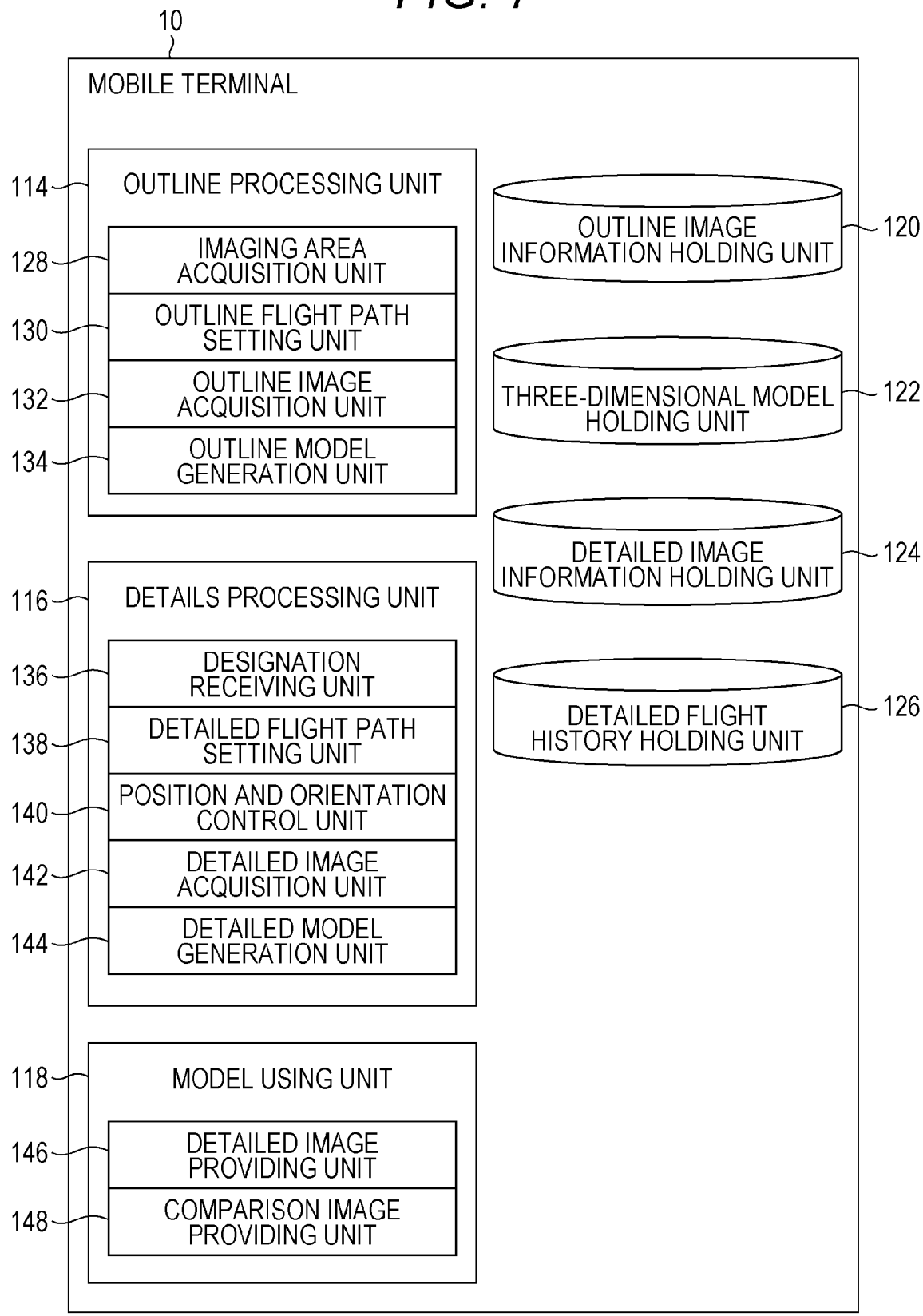
FIG. 7 is a block diagram illustrating functions and a configuration of the mobile terminal illustrated in FIG. 1.

FIG. 7 is a block diagram illustrating functions and a configuration of the mobile terminal 10 in FIG. 1. In terms of hardware, each block illustrated in the block diagram of the present specification can be achieved by an element and a mechanical device including a CPU of a computer. In terms of software, each block can be achieved by a computer program and the like. Here, the block diagram depicts a functional block to be achieved by cooperation therebetween. Therefore, it is to be understood by those skilled in the art that these functional blocks can be achieved in various forms by combinations of hardware and software.

The mobile terminal 10 includes an outline processing unit 114, a details processing unit 116, a model using unit 118, an outline image information holding unit 120, a three-dimensional model holding unit 122, a detailed image information holding unit 124, and a detailed flight history holding unit 126. The outline processing unit 114 performs a process related to generation of the outline three-dimensional model 18. The details processing unit 116 performs a process related to generation of the detailed three-dimensional model 24. The model using unit 118 performs a process related to the use of the generated detailed three-dimensional model 24.

FIG. 8 is a data structure diagram illustrating an example of the outline image information holding unit 120 in FIG. 7. The outline image information holding unit 120 holds a situation when the drone 8 acquires an outline or coarse image (hereinafter, referred to as an outline image) while flying according to the outline flight path 16 and a situation when the outline image was acquired. The outline image information holding unit 120 holds an outline flight ID that specifies a flight of the drone 8 that follows the outline flight path 16, time when the drone 8 acquired the outline image, and a position of the drone 8 when the drone 8 acquired the outline image, and a file of the outline image in association with each other. The position of the drone 8 when the drone 8 acquired the outline image may be given by the positioning function of the drone 8. The size of the file of the outline image may be relatively small.

FIG. 9 is a data structure diagram illustrating an example of the detailed image information holding unit 124 in FIG. 7. The detailed image information holding unit 124 holds a detailed or fine image (hereinafter, referred to as a detailed image) that the drone 8 acquires while flying according to the detailed flight path 22, and a situation when the detailed image was acquired. The detailed image information holding unit 124 holds a detailed flight ID that specifies a flight of the drone 8 that follows the detailed flight path 22 (hereinafter, referred to as a detailed flight), a designated part ID that specifies a part designated by the user 4, and a drone 8 holds time when the detailed image was acquired, a position of the drone 8 when the drone 8 acquired the detailed image, and a file of the detailed image in association with each other. The size of the file of the detailed image may be relatively large, and may be, for example, larger than the size of the outline image file.

FIG. 10 is a data structure diagram illustrating an example of the detailed flight history holding unit 126 in FIG. 7. The detailed flight history holding unit 126 holds a detailed flight history. The detailed flight history holding unit 126 holds the detailed flight ID, an object ID for specifying the object to be inspected, the designated part ID, a designated rectangular image file, time when the detailed flight was performed, and information on the detailed flight path 22 in the detailed flight, the file of the detailed image of the designated part in association with each other. The designated rectangular image file is a file of an image including the rectangle 20 drawn by the user 4 with respect to the outline three-dimensional model 18 when the designation of the designated part is received from the user 4. For example, the designated rectangular image file may be a screen capture of the display 102 illustrated in FIG. 3. The file of the detailed image of the designated part may be a file of a designated detailed image described later.

Returning to FIG. 7, the outline processing unit 114 includes an imaging area acquisition unit 128, an outline flight path setting unit 130, an outline image acquisition unit 132, and an outline model generation unit 134. The imaging area acquisition unit 128 acquires information for setting an operation of the drone 8 so that the base station apparatus 6 is imaged. The imaging area acquisition unit 128 displays the electronic map on the display 102 of the mobile terminal 10, and receives, from the user 4, the designation of the base station apparatus 6 as the object to be inspected and the designation of the imaging area 12 via the electronic map.

The outline flight path setting unit 130 generates the operation of the drone 8, that is, the outline flight path 16 so as to image the base station apparatus 6 on the basis of the information acquired by the imaging area acquisition unit 128. The outline flight path setting unit 130 sets the outline flight path 16 in the drone 8 by transmitting the generated outline flight path 16 to the drone 8.

The outline image acquisition unit 132 acquires, from the drone 8, the outline image acquired as a result of the drone 8 performing a flight according to the outline flight path 16 (hereinafter, referred to as an outline flight). The outline image acquisition unit 132 receives the outline image sequentially transmitted from the drone 8 during the outline flight of the drone 8, time when the outline image was acquired and a position when the outline image was acquired, and stores the time and the position in the outline image information holding unit 120.

The outline model generation unit 134 reads the outline image held in the outline image information holding unit 120, and generates the outline three-dimensional model 18 of the base station apparatus 6 on the basis of the read outline image. The outline model generation unit 134 registers the generated outline three-dimensional model 18 in the three-dimensional model holding unit 122.

The details processing unit 116 includes a designation receiving unit 136, a detailed flight path setting unit 138, a position and orientation control unit 140, a detailed image acquisition unit 142, and a detailed model generation unit 144. The designation receiving unit 136 uses the outline three-dimensional model 18 generated from the outline image to receive the designation of the part of the base station apparatus 6 from the user 4. When receiving a request for confirming the details of the base station apparatus 6 from the user 4, the designation receiving unit 136 reads the outline three-dimensional model 18 of the base station apparatus 6 held in the three-dimensional model holding unit 122 and causes the display 102 to display the outline three-dimensional model 18. The designation receiving unit 136 specifies, as the designated part, the part of the base station apparatus 6 displayed in the rectangle 20 drawn by the user 4, with respect to the displayed outline three-dimensional model 18. A function at the time of a re-designation by the designation receiving unit 136 will be described later.

The detailed flight path setting unit 138 generates the operation of the drone 8, that is, the detailed flight path 22 so that the detailed image of the designated part that is more detailed than the outline image of the designated part acquired in the outline flight is acquired. The detailed flight path setting unit 138 sets the detailed flight path 22 to the drone 8 by transmitting the generated detailed flight path 22 to the drone 8.

When generating the detailed flight path 22, the detailed flight path setting unit 138 uses the positioning information acquired in the outline flight. More specifically, the detailed flight path setting unit 138 first specifies the outline image in which the designated part is captured. This may be achieved, for example, by specifying the outline image that is a source for forming the designated part in the outline three-dimensional model 18. Alternatively, this may be achieved by specifying, from the outline images held in the outline image information holding unit 120, an outline image corresponding to the rectangle 20 drawn by the user 4 when the user designates the part. The detailed flight path setting unit 138 refers to the outline image information holding unit 120 and acquires the position associated with the specified outline image. The detailed flight path setting unit 138 sets a position of a first destination of the detailed flight path 22 on the basis of the acquired position. The detailed flight path setting unit 138 sets the flight path of the drone 8 after the drone 8 arrives at the first destination so that the designated part is imaged from a plurality of different viewpoints. A shape of the detailed flight path 22 from the start point to the first destination may be set so that the detailed flight path 22 is the shortest path to the designated part (or the position of the first destination) and avoids any obstacles on the way.

The position and orientation control unit 140 compares the outline image in which the designated part specified by the detailed flight path setting unit 138 is captured with a current image acquired by the imaging function of the drone 8, thereby controlling the drone 8 so that a position or orientation for imaging the designated part is adjusted. The position and orientation control unit 140 transmits, to the drone 8, the outline image in which the designated part specified by the detailed flight path setting unit 138 is captured. When the drone 8 flies along the detailed flight path 22 and reaches near the first destination, the drone 8 compares the received outline image with the current image of the designated part acquired by the imaging function of the drone 8. The drone 8 adjusts the position and orientation of the drone 8 and/or a line-of-sight direction and a focal length of the camera of the drone 8 so that a difference between both the images is reduced. The detailed image of the designated part imaged by the drone 8 whose position and orientation have been adjusted in this way is referred to as a designated detailed image.

Note that the position and orientation of the drone 8 can be adjusted by other methods. For example, the position and orientation control unit 140 may use a display direction of the outline three-dimensional model 18 displayed on the display 102 when the user 4 designates the part and a position corresponding to the drawn rectangle 20 to adjust the detailed flight path 22 generated by the detailed flight path setting unit 138. Alternatively, when relatively detailed positioning information is given to each object of the outline three-dimensional model 18 (for example, see Non Patent Literature 3), the position and orientation control unit 140 may generate or adjust the detailed flight path 22 on the basis of the positioning information of the object corresponding to the part designated by the rectangle 20.

A specific example of the detailed flight path 22 will be described below.

(1) A straight flight from the starting point to the first destination→adjustment of the position and orientation by image comparison→capturing of the designated detailed image→imaging from multiple angles while flying around the designated part→return (2) A circular flight from the starting point to the first destination (to avoid obstacles)→controlling of pan, tilt, and zoom (PTZ) to adjust the camera to a designated direction and a focal length while hovering at the first destination-→capturing of the designated detailed image→imaging from multiple angles while flying around the designated part→return The detailed image acquisition unit 142 acquires, from the drone 8, the detailed image acquired as a result of a detailed flight performed by the drone 8. The detailed image acquisition unit 142 receives the detailed image sequentially transmitted from the drone 8 during the detailed flight of the drone 8, and time when the detailed image was acquired and a position when the detailed image was acquired, and stores the time and the position in the detailed image information holding unit 124.

The detailed model generation unit 144 reads the detailed image held in the detailed image information holding unit 124, and generates the detailed three-dimensional model 24 of the designated part on the basis of the read detailed image. The detailed model generation unit 144 registers the generated detailed three-dimensional model 24 in the three-dimensional model holding unit 122.

When one detailed flight is completed and a corresponding detailed three-dimensional model 24 is stored in the three-dimensional model holding unit 122, the details processing unit 116 registers information on the detailed flight in the detailed flight history holding unit 126.

The model using unit 118 includes a detailed image providing unit 146 and a comparison image providing unit 148. The detailed image providing unit 146 reads the detailed three-dimensional model 24 of the designated part held in the three-dimensional model holding unit 122 and causes the display 102 to display the detailed three-dimensional model 24. Alternatively, the detailed image providing unit 146 may cause the display 102 to display the designated detailed image instead of the detailed three-dimensional model 24. A function of the comparison image providing unit 148 will be described later.

An operation of the mobile terminal 10 having the above configuration will be described.

Figure 11:
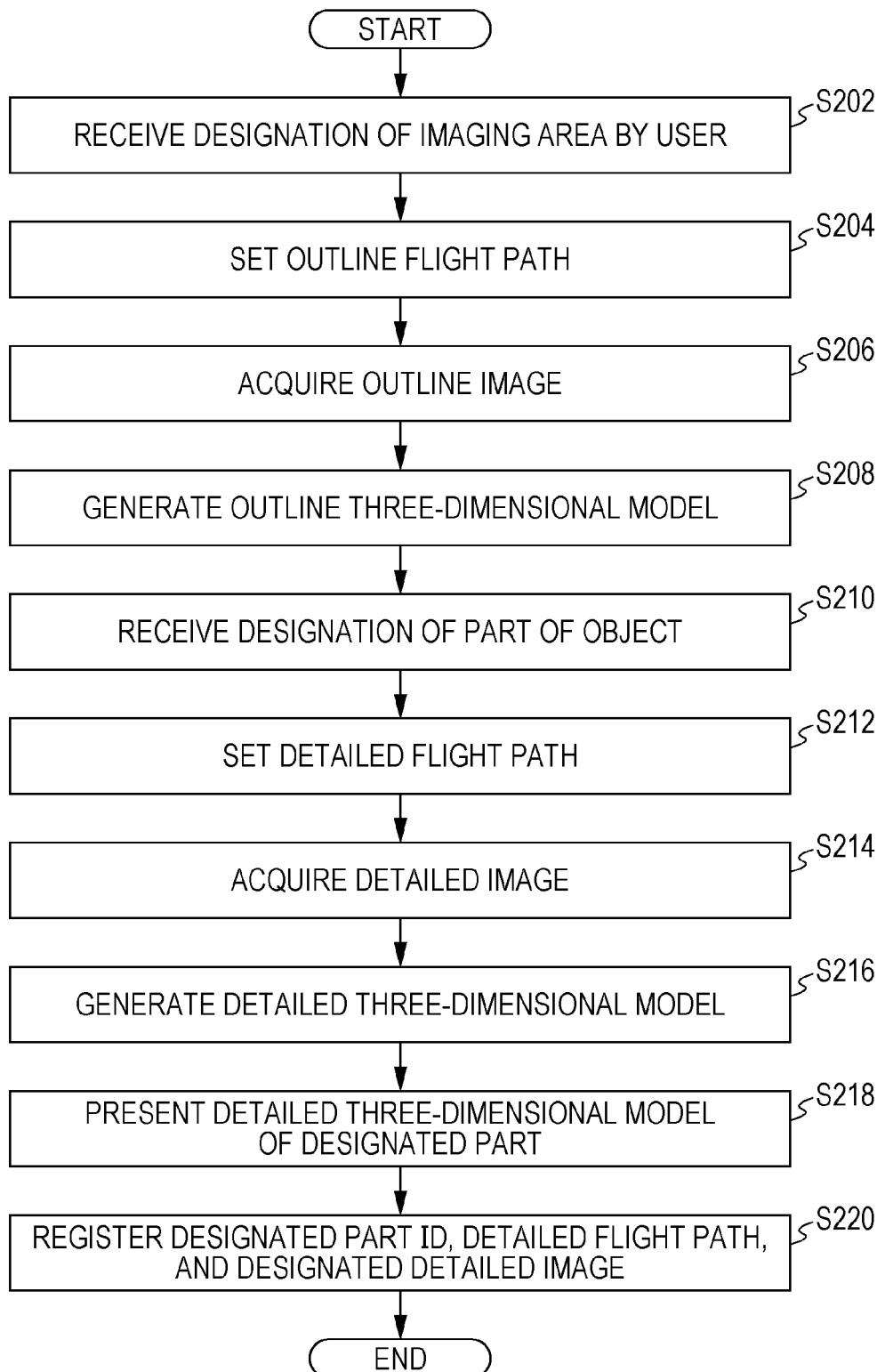
FIG. 11 is a flowchart illustrating a flow of a series of processes in the mobile terminal illustrated in FIG. 1.

FIG. 11 is a flowchart illustrating a flow of a series of processes in the mobile terminal 10 in FIG. 1. The mobile terminal 10 receives the designation of the imaging area 12 by the user 4 (S202). The mobile terminal 10 sets the outline flight path 16 on the basis of the imaging area 12 that has been received (S204). The mobile terminal 10 acquires the outline image from the drone 8 (S206). The mobile terminal 10 uses the acquired outline image to generate the outline three-dimensional model 18 (S208). The mobile terminal 10 receives the designation of a part that is an object for a detailed inspection from the user 4 via a display of the outline three-dimensional model 18 (S210). The mobile terminal 10 sets the detailed flight path 22 so that a detailed image of the designated part is acquired (S212). The mobile terminal 10 acquires the detailed image from the drone 8 (S214). The mobile terminal 10 uses the acquired detailed image to generate the detailed three-dimensional model 24 (S216). The mobile terminal 10 presents the detailed three-dimensional model 24 or the designated detailed image of the designated part to the user 4 (S218). The mobile terminal 10 registers the designated part ID, the detailed flight path 22, and the designated detailed image in the detailed flight history holding unit 126 (S220).

Figure 12:
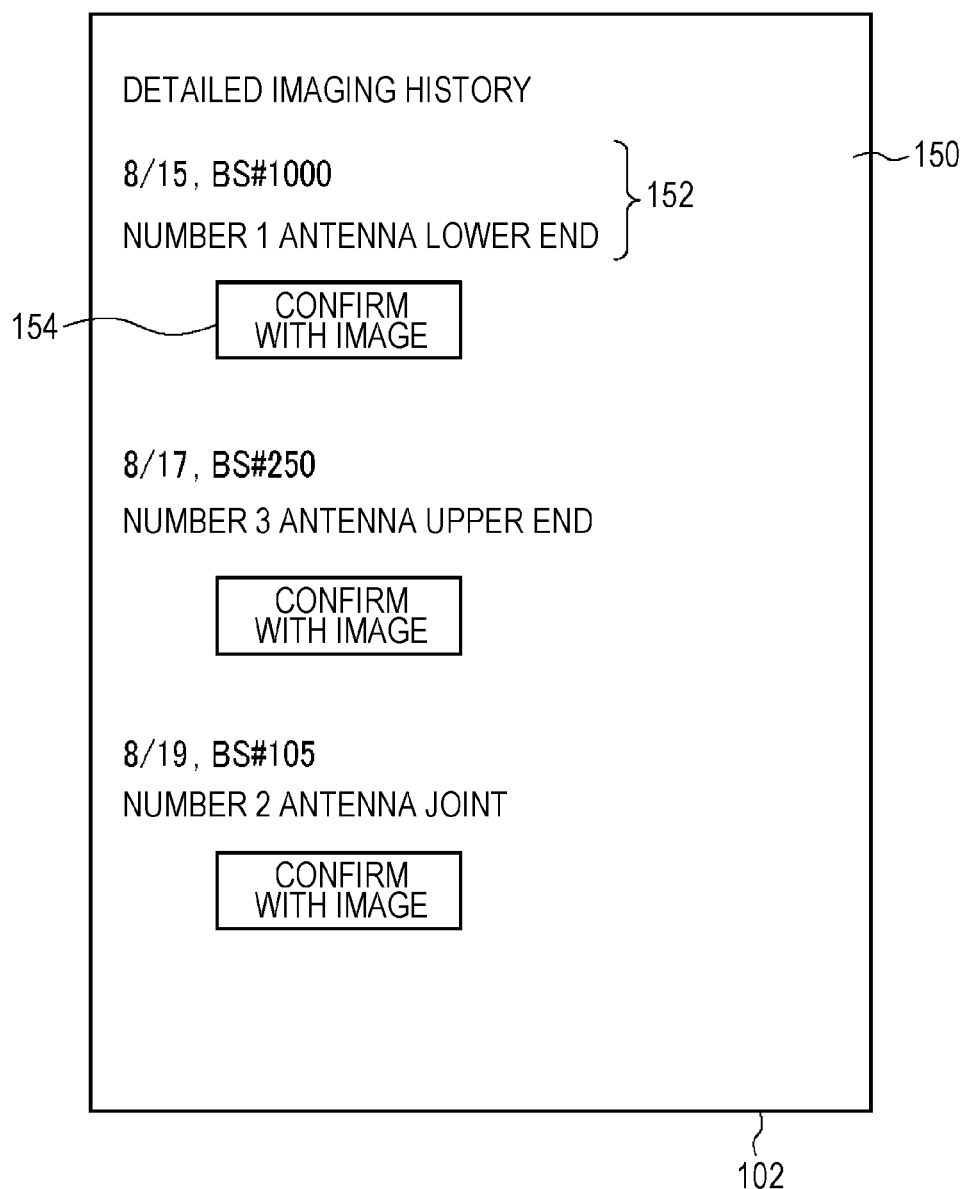
FIG. 12 is a representative screen diagram of a detailed imaging history selection screen displayed on a display of the mobile terminal.

FIG. 12 is a representative screen diagram of a detailed imaging history selection screen 150 displayed on the display 102 of the mobile terminal 10. The detailed imaging history selection screen 150 displays, for each past detailed flight, information 152 for specifying the past detailed flight, and a confirm with image button 154. The information 152 for specifying the past detailed flight includes a date on which the detailed flight was performed, a name of the object to be inspected, and a name of the designated part. Upon receiving a request of displaying an imaging history from the user 4, the designation receiving unit 136 generates the detailed imaging history selection screen 150 by referring to the detailed flight history holding unit 126, and causes the display 102 to display the detailed imaging history selection screen 150. The date on the detailed imaging history selection screen 150 corresponds to the time when the detailed flight was performed in the detailed flight history holding unit 126, and the name of the object to be inspected on the detailed imaging history selection screen 150 corresponds to the object ID in the detailed flight history holding unit 126, and the name of the designated part on the detailed imaging history selection screen 150 corresponds to the designated part ID in the detailed flight history holding unit 126.

Figure 13:
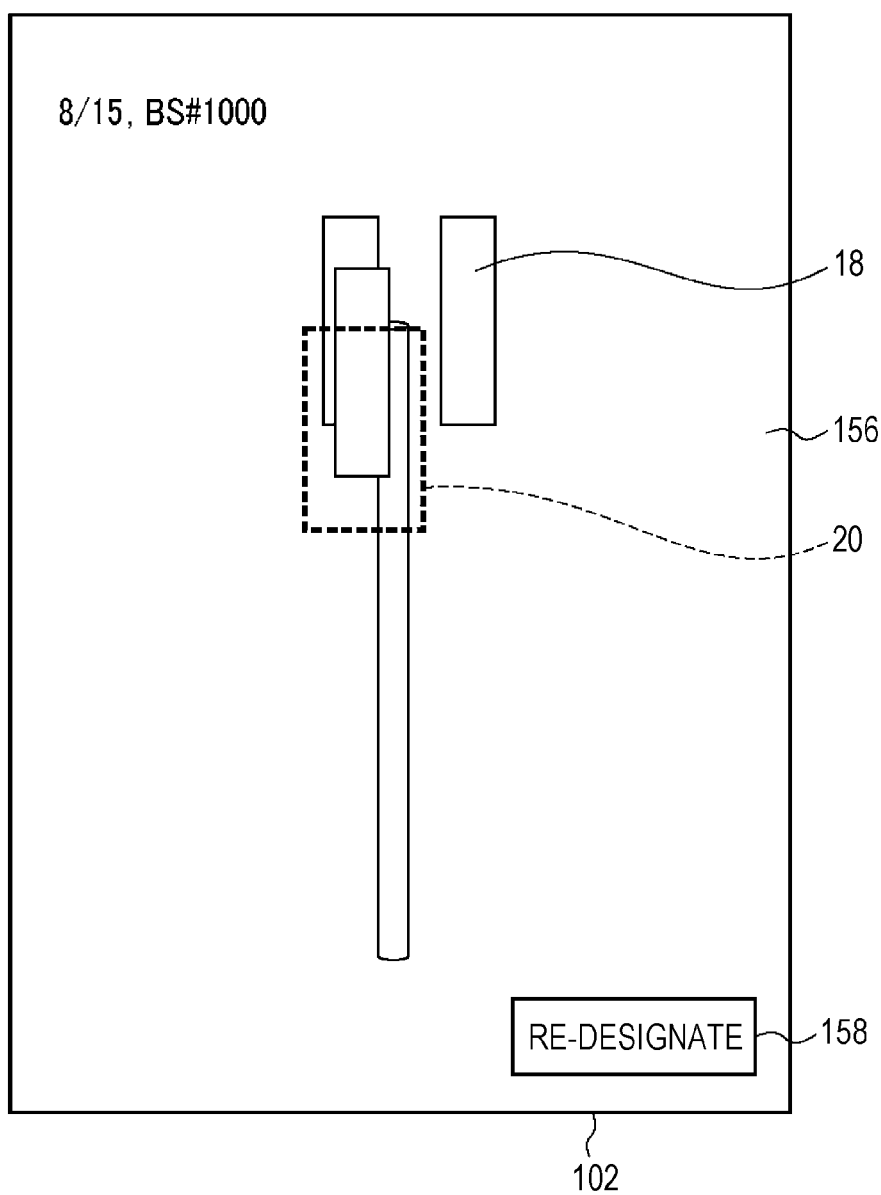
FIG. 13 is a representative screen diagram of a designated part confirmation screen displayed on the display of the mobile terminal.

FIG. 13 is a representative screen diagram of a designated part confirmation screen 156 displayed on the display 102 of the mobile terminal 10. When the user 4 taps a confirm button 154 of a desired detailed flight on the detailed imaging history selection screen 150, the designation receiving unit 136 reads the designated rectangular image file corresponding to the detailed flight of the confirm button 154 tapped from the detailed flight history holding unit 126, and generates the designated part confirmation screen 156. The designated part confirmation screen 156 is an image including the rectangle 20 drawn by the user 4 with respect to the outline three-dimensional model 18 when the designation of the designated part was received from the user 4 with respect to the detailed flight of the tapped confirm button 154 and a re-designate button 158. For example, when the user 4 taps the confirm button of the past detailed flight specified by "8/15, BS #1000, number 1 antenna lower end" among the detailed flight histories displayed on the detailed imaging history selection screen 150 illustrated in FIG. 12, the screen changes and the designated part confirmation screen 156 is displayed. On the designated part confirmation screen 156, a rectangle that the user 4 drew to designate the lower end of a number 1 antenna (designated part) on the display 102 where the outline three-dimensional model of BS #1000 (name of the base station apparatus 6) was displayed on 8/15 (past time) is displayed together with the outline three-dimensional model.

The user 4 confirms the designated part on the designated part confirmation screen 156, and taps the re-designate button 158 if there is no problem. Then, the designation receiving unit 136 receives the tap as a request for re-imaging the designated part. The detailed flight path setting unit 138 reads the detailed flight path corresponding to the designated rectangular image file read at the time of generation of the designated part confirmation screen 156 from the detailed flight history holding unit 126, and transmits the detailed flight path to the drone 8, thereby being able to set again the same detailed flight path as the past detailed flight path in the drone 8.

Note that in another embodiment, a designation receiving unit 136 may cause a display 102 to display a screen that displays a designated detailed image or a detailed three-dimensional model acquired in the past instead of the designated part confirmation screen 156. In this case, when a user 4 requests a re-designation, the designation receiving unit 136 reads a detailed flight path corresponding to a designated detailed image being displayed or the detailed three-dimensional model being displayed from the detailed flight history holding unit 126, and sets again the detailed flight path in the drone 8.

In an inspection of an infrastructure facility such as a base station apparatus and a building, it has been empirically known that a pat to be inspected with priority and a part to be always inspected every time. In an example of the base station apparatus, since degradation starts from the tip of the antenna, the tip is a part that is always confirmed in every inspection. In the present embodiment, once the designated part that needs to be repeatedly inspected is specified from the outline three-dimensional model in the first inspection, the setting of the detailed flight path to the drone 8 in the next and subsequent inspections is simply completed just by selecting the designated part from the detailed flight history. As a result, users' convenience is improved.

Figure 14:
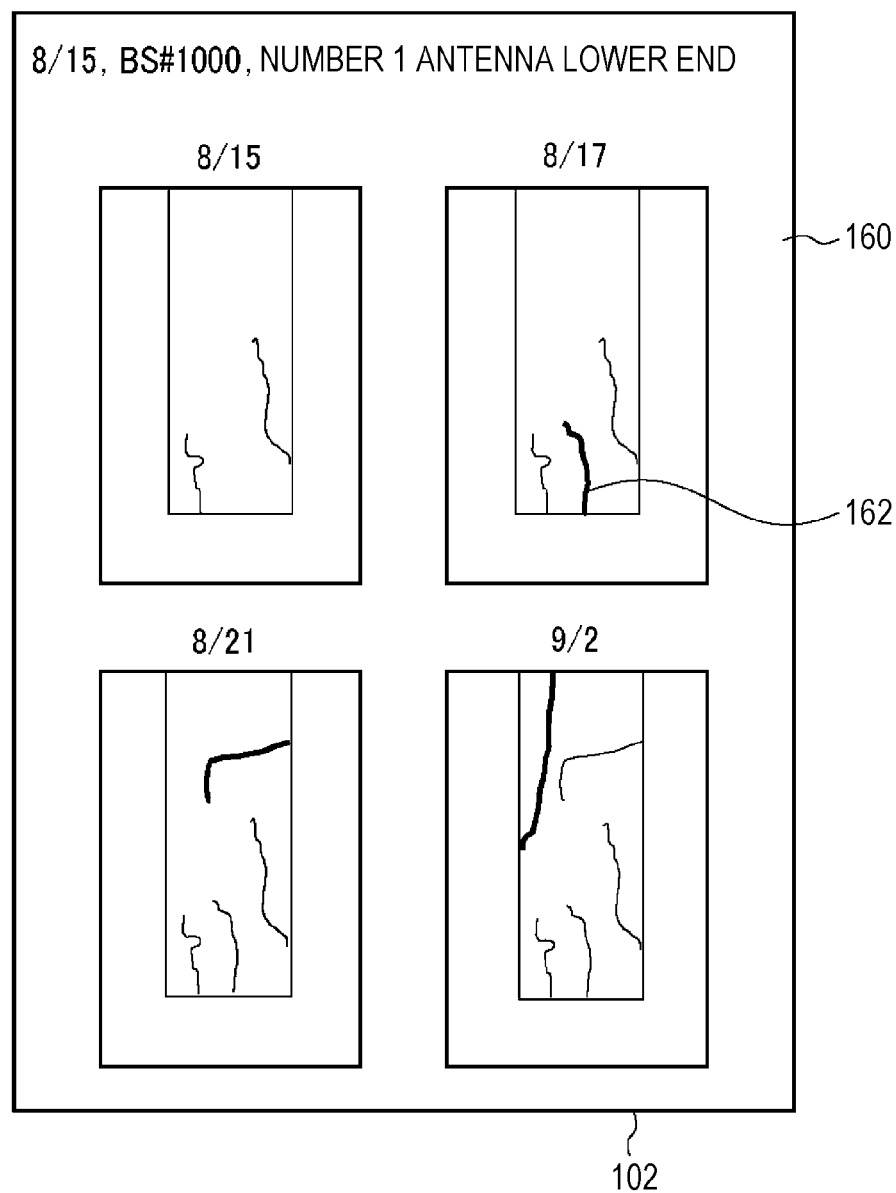
FIG. 14 is a representative screen diagram of a designated part transition screen displayed on the display of the mobile terminal.

FIG. 14 is a representative screen diagram of a designated part transition screen 160 displayed on the display 102 of the mobile terminal 10. The comparison image providing unit 148 causes the display 102 to display the designated part transition screen 160 that displays, in a comparable manner, the detailed images or the detailed three-dimensional models of the same designated part acquired in the detailed flight path 22 at different time points in a comparable manner. When the comparison image providing unit 148 receives a comparison request including the designations of the object to be inspected and the designated part from the user 4, the comparison image providing unit 148 acquires, from the detailed flight history holding unit 126, the file of the designated detailed image corresponding to the designated object to be inspected (object ID) and the designated designated part (designated part ID). The comparison image providing unit 148 generates the designated part transition screen 160 by arranging, in chronological order, the designated detailed images that have been acquired. Note that the detailed three-dimensional model that can be acquired from the three-dimensional model holding unit 122 may be displayed on the designated part transition screen 160 instead of or in addition to the designated detailed image.

In the designated detailed image displayed on the designated part transition screen 160, a difference from an immediately preceding designated detailed image displayed on the same screen is displayed in a highlighted manner. For example, in the designated detailed image corresponding to "8/17" on the designated part transition screen 160 in FIG. 14, a new crack 162 that is a difference from the designated detailed image of "8/15" that is an immediately preceding designated detailed image is displayed in a different manner from other cracks, for example, in an emphasized manner in which the crack 162 is displayed in bold.

In this way, the designated detailed images of the designated designated part are displayed in chronological order, whereby the user 4 can more accurately confirm a deteriorated part and the progress of degradation at a glance.

In the above embodiment, examples of the holding unit are a hard disk and a semiconductor memory.

Additionally, it is to be understood by those skilled in the art referred to the present specification that on the basis of the description in the present specification, each part can be achieved by a CPU (not illustrated), a module of an installed application program, a module of a system program, a semiconductor memory that temporarily stores the content of data read from a hard disk, or the like.

According to the inspection support system 2 according to the present embodiment, a three-dimensional model is generated in two stages of an outline and a detail, by aerial photography of the drone 8, whereby there is no need to generate a detailed three-dimensional model of a part of an object to be inspected other than a part thereof that is desired or required to be inspected. Thus, it possible to reduce the processing load and processing time while achieving a detailed confirmation of the desired or required part. Additionally, since the communication performance required for the drone 8 is not so high, an increase in cost can be suppressed by the use of a relatively inexpensive drone.

The configuration and operation of the inspection support system 2 according to the embodiment have been described above. It is to be understood by those skilled in the art that the embodiment is illustrative, that various modifications can be made to the combination of each constituent element and each process, and that such modifications are also within the scope of the present invention.

In the embodiment, a case where the user 4 performs the inspection by going to the vicinity of the base station apparatus 6 and operating the mobile terminal 10 has been described, but the present invention is not limited to this. For example, the designation of the base station apparatus 6 as the object to be inspected, the designation of the imaging area 12, the designation of the designated part using the acquired outline three-dimensional model 18, and the confirmation of the designated detailed image may be performed by an operator of a center facility located at a position remote from the base station apparatus 6. The worker only needs to carry the drone 8 to the vicinity of the base station apparatus 6. A process in this case is understood by replacing the mobile terminal 10 of the embodiment with a desktop terminal of the operator.

Alternatively, a three-dimensional model of each component of the base station apparatus 6 may be stored in advance on the desktop terminal of the operator, and the operator may select a designated part from the three-dimensional model.

REFERENCE SIGNS LIST

2 Inspection support system
4 User
6 Base station apparatus
8 Drone
10 Mobile terminal

The invention claimed is:

1. A terminal that controls an unmanned flying device equipped with an imaging function, the terminal comprising:
   a function of acquiring information for setting a first operation of the unmanned flying device so that an object is imaged;
   a function of acquiring an image acquired as a result of the unmanned flying device performing the first operation from the unmanned flying device;
   a function of using the image to receive a designation of a part of the object from a user;
   a function of setting a second operation of the unmanned flying device so that an image of the designated part of the object that is more detailed than the image of the designated part of the object acquired in the first operation is acquired; and
   a function of causing a display to display, in a comparable manner, images of the designated part of the object acquired in the second operation at a different time point or a three-dimensional model generated by the image, wherein the function of setting the second operation of the unmanned flying device is configured to set the second operation using a past flight path associated with the second operation at the different time point in order to acquire a current image of the designated part of the object, and wherein the terminal further comprises a function of controlling the unmanned flying device so that a position or an orientation for imaging the designated part of the object is adjusted by comparing the image used when the designation of the part of the object is received with a current image acquired by the imaging function of the unmanned flying device.

2. The terminal according to claim 1, wherein the unmanned flying device further includes a positioning function, and the function of setting includes a function to set, on the basis of positioning information acquired in the first operation, a flight path of the unmanned flying device for imaging the designated part of the object.

3. The terminal according to claim 2, further comprising:

a function of registering specific information that specifies the designated part of the object and the flight path determined to image the part in association with each other in a holding means; and a function of, upon receiving a request to image again the designated part of the object, referring to the holding means and setting again the flight path held in association with the part.

4. The terminal according to claim 1, wherein the function of acquiring the information for setting the first operation of the unmanned flying device is configured to acquire the information of the object designated on a map image.

5. A terminal that controls an unmanned flying device equipped with an imaging function, the terminal comprising:

a function of receiving a first designation of an imaging area by a user;

a function of setting an outline flight path on the basis of the imaging area that has been received;

a function of acquiring an outline image from the unmanned flying device while flying according to the outline flight path;

a function of generating an outline three-dimensional model using the acquired outline image;

a function of receiving a second designation of a part that is an object for a detailed inspection from the user via a display of the outline three-dimensional model;

a function of setting a detailed flight path so that a detailed image of the part designated by the second designation is acquired;

a function of acquiring the detailed image from the unmanned flying device while flying according to the detailed flight path, the detailed image being more detailed than the outline image, a function of acquiring information for setting a first operation of the unmanned flying device so that an object is imaged;

a function of acquiring an image acquired as a result of the unmanned flying device performing the first operation from the unmanned flying device;

a function of using the image to receive a designation of a part of the object from a user;

a function of setting a second operation of the unmanned flying device so that an image of the designated part of the object that is more detailed than the image of the designated part of the object acquired in the first operation is acquired; and a function of causing a display to display, in a comparable manner, images of the designated part of the object acquired in the second operation at a different time point or a three-dimensional model generated by the image, wherein the function of setting the second operation of the unmanned flying device is configured to set the second operation using a past flight path associated with the second operation at the different time point in order to acquire a current image of the designated part of the object, and wherein the terminal further comprises a function of controlling the unmanned flying device so that a position or an orientation for imaging the designated part of the object is adjusted by comparing the image used when the designation of the part of the object is received with a current image acquired by the imaging function of the unmanned flying device.

6. The terminal according to claim 5, further comprising a function of generating a detailed three-dimensional model using the acquired detailed image.

7. The terminal according to claim 6, further comprising a function of presenting the detailed three-dimensional model to the user.

8. The terminal according to claim 5, further comprising a function of presenting the detailed image to the user.

9. The terminal according to claim 8, further comprising a function of registering a designated part ID, the detailed flight path and the detailed image in a detailed flight history holding unit.

* * * * *